US008719175B2

(12) United States Patent
Walker

(10) Patent No.: US 8,719,175 B2
(45) Date of Patent: *May 6, 2014

(54) OFFICE BUILDING INEFFICIENCY FACTOR AND SPACE PLANNING CIRCULATION FACTOR CALCULATION SYSTEM AND METHOD

(75) Inventor: Michael J. Walker, Glen Ellyn, IL (US)

(73) Assignee: Spacelogik, LLC, Chicago, IL (US)

( * ) Notice: Subject to any disclaimer, the term of this patent is extended or adjusted under 35 U.S.C. 154(b) by 539 days.

This patent is subject to a terminal disclaimer.

(21) Appl. No.: 13/102,352

(22) Filed: May 6, 2011

(65) Prior Publication Data

US 2011/0208661 A1 Aug. 25, 2011

Related U.S. Application Data

(63) Continuation of application No. 11/287,124, filed on Nov. 22, 2005, now Pat. No. 7,941,381.

(51) Int. Cl.
*G06Q 10/00* (2012.01)
(52) U.S. Cl.
USPC .......................................................... 705/313
(58) Field of Classification Search
USPC .......................................................... 705/313
See application file for complete search history.

(56) References Cited

U.S. PATENT DOCUMENTS

| | | | |
|---|---|---|---|
| 5,590,268 A | 12/1996 | Doi et al. | |
| 6,446,030 B1 | 9/2002 | Hoffman et al. | |
| 6,446,053 B1 | 9/2002 | Elliott | |
| 6,701,281 B2 | 3/2004 | Satoh et al. | |
| 6,782,119 B1 | 8/2004 | Bartlett | |
| 2002/0035408 A1 | 3/2002 | Smith | |
| 2003/0009315 A1 | 1/2003 | Thomas et al. | |
| 2003/0191723 A1 | 10/2003 | Foretich et al. | |
| 2004/0111282 A1 | 6/2004 | Haji-Ioannou | |
| 2004/0122628 A1 | 6/2004 | Laurie | |
| 2004/0172261 A1 | 9/2004 | Davidoff et al. | |

OTHER PUBLICATIONS

Perkins, L. Bradford. "Building Type Basics for Elementary and Secondary Schools." 2001. Wiley & Sons Inc. p. 63.
Real Estate Board of New York. "Recommended Method of Floor Measurement for Office Buildings." 1987 archive.org; https//members.rebny.com.
Thomsett, Michael; "Real Estate Investors Pocket Calculator: Simple Ways to Compute Cashflow, Value, Return, and Other Key Financial Measurements" Oct. 2005; AMACOM; pp. 196-212.
LeaseCorp Floorplan & LeasAnalysis Software: LeaseCorp, Jan. 28, 2001.

*Primary Examiner* — Jamisue A Plucinski
*Assistant Examiner* — Vern Cumarasegaran
(74) *Attorney, Agent, or Firm* — Michael Best & Friedrich LLP

(57) ABSTRACT

A system and method for calculating a space required for a tenant in a building includes determining the areas of rooms required by the tenant. A circulation factor for each of the rooms based on the area of each room is calculated. The total of the room areas and the circulation factors are added to determine a pure space required by the tenant. The losses in actual usable space are determined for a building and an inefficiency factor is calculated based on these losses. The pure space is multiplied by the inefficiency factor to obtain a building efficiency loss. The building efficiency loss is added to the pure space to obtain the space required for the tenant in the building. The system may be configured on a network computer system or a standalone computer.

20 Claims, 9 Drawing Sheets

Building Name:
Address:
Floor:
City:
Date Surveyed:
Surveyor:

|   | Landlord | Leasecorp | |
|---|---|---|---|
| 1. What is the rentable square footage of the floorplate? | 24,000 | 23,621 | Diff: 379 |
| 2. What are the dimensions of the typical column (finished and squared)? | 27.00 by | 25.25 | inches |
| 3. Number of columns on each floor (in rentable area only): | | 22 | 104.16 |
| 4. Is the building a square/rectangle? | | Yes | |
| 5. If the building IS a square/rectangle, the dimensions are: | 198.25 by | 127.83 | feet |
| 6. If the building IS NOT a square/rectangle, how many sides are there? | 0 | Perimeter 652.17 | |

|  | Side 1 | Side 2 | Side 3 | Side 4 | Side 5 | Side 6 | Side 7 | Side 8 | Side 9 | Side 10 |
|---|---|---|---|---|---|---|---|---|---|---|
| Outside perimeter of dominant face | - | - | - | - | - | - | - | - | - | - |
| Number of duplicated sides | 1.0 | 1.0 | 1.0 | 1.0 | 1.0 | 1.0 | 1.0 | 1.0 | 1.0 | |
| 7. Is building side an arc or angle?* | N/A | N/A | N/A | N/A | N/A | N/A | N/A | N/A | N/A | |
| Theta | - | - | - | - | - | - | - | - | - | |
| If an arc, radius | - | - | - | - | - | - | - | - | - | |

\* Workstation to Office ratio for angles and arcs is: 50.0% / 50.0%

Arc and Angle Losses: .................................................................................................. [ - ]

8. Distance from dominant face to usable floor space: 5.25 inches

9. What percentage of the floor is encumbered (not including columns)? 100% 285.32

10. Unusual losses: .................................................................................................... 55.05

|  |  |  |  |  |
|---|---|---|---|---|
| Corner columns | 4.43 | SF | 4 | duplicates |
| Interior columns | 4.00 | SF | 2 | duplicates |
| Water columns | 14.67 | SF | 2 | duplicates |

Building's net inefficiency: 3.4%  823.53

11. What is the building's single tenant loss factor (based on Landlord rsf)? 9.40%  2,256.00
12. What is the building's multi-tenant loss factor (based on Landlord rsf)? 12.77%  3,064.80

SINGLE TENANT INEFFICIENCY FACTOR: 13.2%

MULTI TENANT INEFFICIENCY FACTOR: 16.6%

FIG. 7

| Space & Construction Summary | | | | |
|---|---|---|---|---|
| Space Summary: | | | | |
| Area | Area Size | Square Feet | Qty | Total |
| Reception Area | 15x20 | 300 | 1 | 300 |
| Coat Closet | 3x10 | 30 | 2 | 60 |
| Large Conference Room | 18x30 | 540 | 1 | 540 |
| Small Conference Room | 15x18 | 270 | 1 | 270 |
| Executive Offices | 15x18 | 270 | 3 | 810 |
| Visitor Offices | 10x15 | 150 | 2 | 300 |
| Trading Area | 8x10 | 80 | 6 | 480 |
| Large Workstations | 10x10 | 100 | 24 | 2,400 |
| Small Workstations | 7x10 | 70 | 19 | 1,330 |
| Storage Area | 10x20 | 200 | 1 | 200 |
| Copy/fax Area | 10x25 | 250 | 1 | 250 |
| Computer/telephone Room | 10x20 | 200 | 1 | 200 |
| Break Room | 15x20 | 300 | 1 | 300 |
| Administrative Assistant | 20x20 | 400 | 1 | 400 |
| | Estimated Basic Square Feet: | | | 7,840 |
| | Plus Circulation Loss: 132 | | | 2,258 |
| | Estimated Usable Square Feet: | | | 10,098 |
| | Plus 20.00% Building Inefficiency: 134 | | | 2,020 |
| | Estimated Rentable Square Feet: | | | 12,118 |

FIG. 8

OFFICE BUILDING INEFFICIENCY FACTOR AND SPACE PLANNING CIRCULATION FACTOR CALCULATION SYSTEM AND METHOD

REFERENCE TO RELATED APPLICATIONS

This application is a continuation of prior U.S. patent application Ser. No. 11/287,124, filed Nov. 22, 2005, now U.S. Pat. No. 7,941,381.

TECHNICAL FIELD

The present invention relates to commercial real estate office buildings and, more particularly, to a system and method for calculating a circulation factor and an inefficiency factor for office buildings or the like that allows a user to project the space required for a user of office space and the usable square footage available for a building space so that an appropriate building space may be selected for the user's requirements.

BACKGROUND OF THE INVENTION

Commercial tenants typically pay a monthly rent for leased space for offices or the like based on the square footage of the space. Commercial office rent is calculated based on taxes, operating expenses, debt service, tenant construction costs, marketing costs and profit (or return on landlord investment). Landlords evaluate these costs on a per-square-foot basis. The only part of the rent a tenant typically can negotiate is the profit segment, which is usually 5% to 15% of the rental rate. By reducing the amount of space required by a tenant, however, the effect is cost reduction on the entire rent, not just the profit portion. A tenant may thus realize substantial rent savings if they reduce the space they lease by reducing inefficient architectural designs and avoiding buildings that have low efficiency ratings.

In view of the above, it is becoming increasingly important for tenants to accurately determine the amount of leased space that they actually require so design and architectural inefficiencies can be identified and eliminated. Real estate leasing firms, brokers and professional licensed architects predominantly use a multiplier to calculate space requirements. For example, the multiplier could be 200 square feet per person so that a company with 50 people would have a calculated requirement of 10,000 square feet. But some industries need more space per person because of the size and mix of executive offices and workstations. For example, attorneys and accountants may need 250-300 square feet per person because they typically use a higher ratio of offices to cubicles. Insurance companies and software consultants, however, use more cubicles than offices and may need only 150 square feet per person.

In addition, real estate leasing firms and architectural firms typically don't consider that every company has its own distinct space requirements. An analysis of the needs of two companies with similar revenues in the same industry may provide two very different results. For example, one company might want a twenty-person boardroom while the other wants a twelve-person conference room. One may decide a 6'×6' cube is big enough for employees while the other will opt for 8'×8' workstations (almost double the space). One president might want a modest 12'×15' office, the other a 20'×30' oasis with a private washroom and a wet bar. Companies may also have their own set of workspace standards, which can vary as much as 75% across an industry. Despite this variety of company needs, brokers and architectural firms typically still use the antiquated 'rule of thumb' multiplier approach to estimate space requirements, which often leads to considerable oversizing of the tenant's space.

Another disadvantage for tenants in the 'how much space do you need?' scenario is the fact that landlords, as a marketing device, often offer free space planning to potential tenants. Oftentimes, however, the landlord's architect does the planning. This is beneficial for the landlord, who usually negotiates a 'quantity discount' rate with the architect for the planning services, but not so beneficial for the tenant because the architect is paid by the square foot. As a result, the larger the space architects lay out for tenants, the more the architects are paid. Both the architect and the landlord therefore want to see the tenant contract for as much space as possible. As a result, efficient space planning is rarely emphasized by landlords or their architects.

Building spaces often feature inefficiencies which reduce the amount of actual usable square footage and, in turn, increase the amount of space tenants will need to lease. More specifically, because of numerous factors, the space efficiency of buildings varies greatly. Columns, HVAC apparatus, building loss factors and unusual building shapes (curved sides and any angles other than 90°) increase space inefficiency and are all elements that can vary greatly from building to building. As a result, the actual usable space that is available to a tenant is actually less than the amount advertised by the landlord. Because of these varying inefficiencies from building to building, one building will require a 10,000 square foot space for a tenant while another less efficient building will need 11,000 square feet for identical tenant requirements. Using this "space efficiency" concept, a tenant can realize substantial rent savings.

In view of the savings available to tenants, systems and methods for matching actual tenant space requirements with the appropriate commercial leased space have been developed. One such prior art system uses the Space Analysis Report software developed by Leasecorp, Inc. of Oak Brook, Ill. This software itemizes a tenant's requirements so that a net usable square footage requirement is calculated. To this, a circulation factor is added to obtain a gross usable square footage requirement. The circulation factor is usually between 25% and 50% of the net usable square footage requirement, depending on the number of workstations versus private offices and larger work areas. A landlord's building loss factor for a specific building, usually obtained using Building Owners and Managers Association International (BOMA) standards, is added to the gross usable square footage requirement to obtain a gross rentable square footage requirement for the building. An example of the calculation is presented in the Table 1.

TABLE 1

| Prior Art Calculation of Required Space | | |
|---|---|---|
| Net Usable Square Footage Requirement: | Simply the net square footage when all area requirements are added together (before circulation): | 10,500 |
| Circulation Factor: | An estimated percentage multiplier for circulation aisles between work areas and ingress/egress aisles. In this case, 30% was used. | 3,150 |
| Gross Usable Square Footage Requirement: | The sum of net usable square footage and circulation area as determined by the circulation factor add-on. | 13,650 |
| Building Loss Factor Add-on: | The percentage determined by landlord (usually using BOMA standards) to gross up usable square footage to rentable square footage. In this case, 14% was used. | 1,911 |

TABLE 1-continued

Prior Art Calculation of Required Space

| | | |
|---|---|---|
| Gross Rentable Square Footage for Building: | Total space that should be required to lay out the given requirements in this particular building: | 15,561 |

While the Space Analysis Report software performs well, manually estimating the circulation factor is only slightly more scientific than the historical "multiplier" process. In addition, the space projections provided by the software sometimes come up short due to building inefficiencies when applied to buildings that are older, irregularly shaped (outer walls having curves and/or odd angles) or that have large heating mechanisms on the perimeter. This is because these inefficiency factors are not included in BOMA calculations.

A need therefore exists for a system and method that permits a tenant or other user to accurately project the tenant's actual space needs and that permits a tenant or other user to project the actual usable and rentable square footage that will be required in assorted buildings with varying efficiencies.

SUMMARY OF THE INVENTION

The present invention is a system and method for calculating a space required for a tenant in a building. The areas of rooms required by the tenant are determined and then a circulation factor for each of the rooms based on the area of each room is calculated. The calculation assumes that the room is an office or the like, workstation, closet or filing cabinet based on the area of the room and considers the required aisles. The total of the room areas and the circulation factors are added to determine a pure space required by the tenant.

The losses in actual usable space are determined for a building and an inefficiency factor is calculated based on these losses. The losses may include an inaccurate measurement loss, a column loss, an unusual building shape loss, a window line encumbrance loss, unusual losses that do not fit in the other categories and building "add on" or "loss" factors. The pure space is multiplied by the inefficiency factor to obtain a building efficiency loss. The building efficiency loss is added to the pure space to obtain the space required for the tenant in the building. The inefficiency factor may be a single tenant inefficiency factor for use in calculating the space required when only the tenant will be occupying a floor of the building. Alternatively, the inefficiency factor may be a multi-tenant inefficiency factor for use in calculating the space required when the tenant will have to share a floor of the building with another tenant or tenants.

The system may be configured on a network computer system or a standalone computer. The system may also feature workstations that connect to a web server over the Internet using, for example, Microsoft's .NET framework.

The following detailed description of embodiments of the invention, taken in conjunction with the appended claims and accompanying drawings, provides a more complete understanding of the nature and scope of the invention.

BRIEF DESCRIPTION OF THE DRAWINGS

FIG. 1 shows a circulation factor data entry screen in an embodiment of the system and method of the present invention;

FIG. 4 shows an efficiency data entry screen in an embodiment of the system and method; of the present invention;

FIG. 7 shows a report produced by an embodiment of the system of the present invention and in accordance with an embodiment of the method of the present invention;

FIG. 8 shows another report produced by an embodiment of the system of the present invention and in accordance with an embodiment of the method of the present invention;

DETAILED DESCRIPTION OF THE INVENTION

Figure 2:
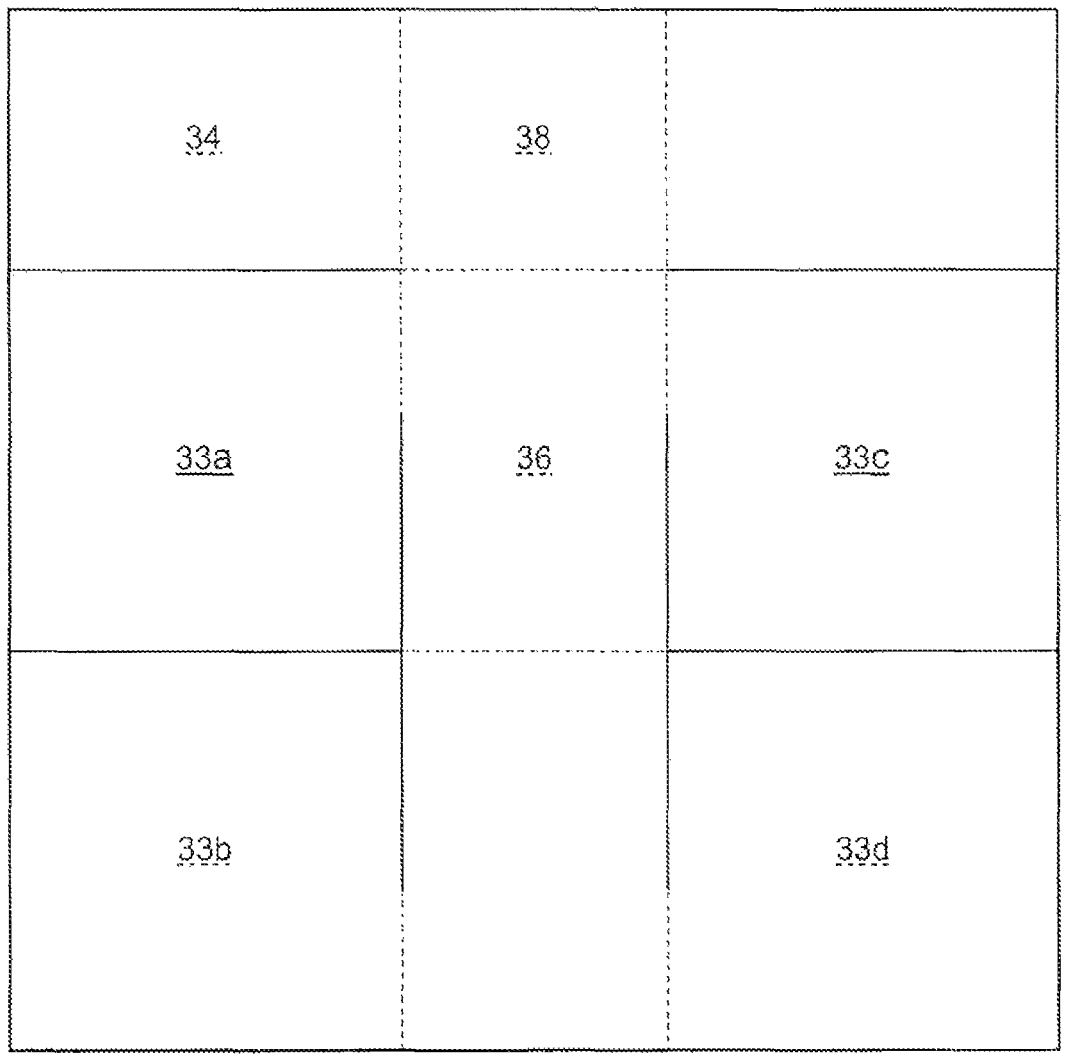
FIG. 2 is apian view of a four workstation group and corresponding aisles.

The system and method of the present invention uses a two-phase process to determine the correct amount of space required for a tenant in a building. During the first phase, formulas are used to calculate circulation factors on a room-by-room basis in accordance with the office space requirements for the tenant. The circulation factors and office space requirements are then added to determine the "pure space" required by the tenant. The pure space is the amount of space required in a perfectly efficient environment—a perfect rectangle with no columns or inefficiencies of any kind. As a result, the system and method of the invention takes a set of given office space requirements (reception areas, offices, workstations, file areas, etc.), and projects how much circulation area is required (aisle ways, ingress, egress, etc.) to establish the ideal or pure space.

During the second phase, the pure space calculated during the first phase is multiplied by a "building inefficiency factor." No building is 100% efficient in that each has elements that affect just how efficient it is in terms of usable floor space. In accordance with the present invention, a building inefficiency factor provides a way of measuring the relative efficiency of various office buildings. This ratio is expressed in percentage form for a building and, when multiplied by any amount of pure space, projects how much additional space is required for building inefficiencies (the "building efficiency loss"). The sum of the pure space and the building inefficiencies is the total rentable square footage required by a tenant for the building.

Phase 1: Circulation Factor Calculation

Figure 1:
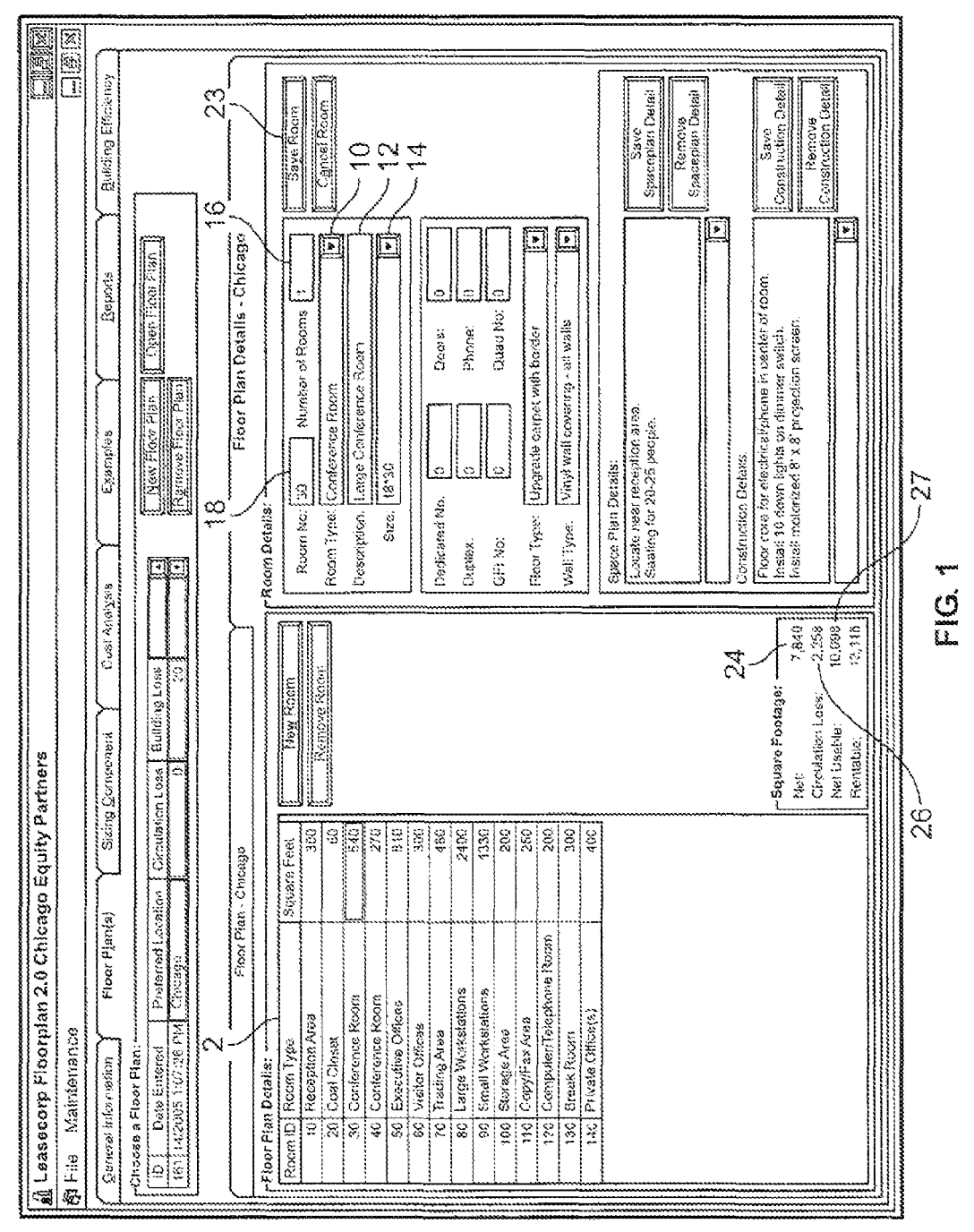

The circulation factor data entry screen of an embodiment of the system of the present invention is presented in FIG. 1. The screen or template is displayed to a user on a standard computer workstation display. The user enters into field 10 the room type (conference room, reception area, executive office, etc.). Field 10 preferably uses a pull-down menu to ensure that room names are entered in a consistent fashion. Any additional room descriptive details are entered in field 12 while the room size is entered in field 14. Field 14 preferably also features a pull-down menu of standard room sizes. If a number of identical rooms are to be entered, field 16 may be set to the appropriate number of rooms to eliminate redundant data entry. Each room entry is automatically assigned an identification number, which is indicated in field 18, and a summary of the data entered is presented in table 22 when the user selects the "Save Room" button 23.

A running total of the net square footage is maintained in field 24 of the screen of FIG. 1 as the data is entered. The circulation loss or factor is also calculated for each room as the data is entered and a running total of the circulation factor is maintained in field 26. The total of the net square footage required by the tenant and the circulation factors for the rooms is the net usable space required, which is calculated and displayed in field 32 of FIG. 1.

The formula used to calculate a circulation factor for a room or other user space requirement is selected by the system of the present invention based on the square footage of the room or user space requirement.

For standard areas greater than or equal to 100 square feet, the circulation factor is calculated by multiplying 2.5 feet (½ the width of a standard aisle) times the square roof of the space in question. For example, a 10'×15' office would have a circulation factor of 30.62, which is 2.5 times 12.25 (12.25 is the square root of 150 square feet). While these example calculations and the example calculations below are based on the default standard aisle width of 5 feet and the default secondary aisle width of 4 feet, the system accommodates alternative aisle dimensions that may be provided by the user.

For areas equal to or greater than 50 square feet and less than 100 square feet, the circulation factor calculation assumes a workstation with side wall panels and is therefore slightly more complicated. The square root of the space in question is initially multiplied by 2.5 feet (½ the width of a standard aisle). Since workstations of this size are usually in "packs" or "clusters" of four, stacked two high, such as workstations 33a, 33b, 33c and 33d illustrated in FIG. 2, the primary aisle 34 in FIG. 2, is assumed to be shared by two workstations (33a and 33b). As a result, this number is divided by two.

The circulation factor must also include an additional calculation for aisles needed to access the interior workstations. Since these secondary aisles, illustrated at 36 in FIG. 2, are typically 4 feet, the square root of the area is also multiplied by 2 feet (½ of a 4 foot aisle) and added to the previous total. In addition, other small adjustments in the calculation are made. These include the width of the workstation side wall panels being used. For example, an 8'×8' workstation using 2" panels is actually 8' 4"×8'4". The user may provide the system with alternative panel thicknesses for use in the calculations. The aisle that links the primary aisle with the secondary aisle, illustrated at 38 in FIG. 2, must also be included. This is accomplished by assuming a 4'×2.5' aisle (width of secondary aisle×½ the width of the primary aisle) that is divided by four since four workstations share the area.

As an example, the 8'×8' workstation of FIG. 2 carries the following circulation area requirement:

1) For primary aisle 34 in FIG. 2: {8' 4" (since 4" for panels)* 2.5' (=½ of a 5' aisle)}/2 (because shared by stations 33a and 33b)=10.41 square feet
2) Workstation wall panel area: (8' 4"*8' 4")–(8'*8') (=area with panels–area without panels)=5.44 square feet
3) For secondary aisle 36 in FIG. 2: 8' 4"*2 (½ of a 4' aisle)=16.67 square feet
4) For aisle 38 in FIG. 2: {4' (width of secondary aisle)*2.5' (=½ width of main aisle)}/4 (=number of stations sharing area)=2.5 square feet
TOTAL: 10.41+5.44+16.67+2.5=35.02 square feet circulation factor per workstation For areas less than 50 square feet, the calculation of the circulation factor is almost identical to that for areas greater than 50 square feet and less than 1,00 square feet except that the smaller area would dictate a smaller individual workstation (for example, 7'×7') and thus a six-workstation cluster instead of a four-workstation cluster. That would, in turn, change the calculations in that the calculation for aisle 34 in FIG. 2 would be divided by three instead of two and the calculation for aisle 38 in FIG. 2 would be divided by six instead of four. As a result, the calculation 1) of the above example would feature a denominator of three instead of two and the calculation 4) of the above example would feature a denominator of six instead of four.

For areas where one dimension is less than or equal to 3 feet, no circulation factor is needed because the short depth implies a coat closet or filing cabinet. These are usually accessible from the aisle way and don't require circulation.

The circulation factor must also address municipal fire code egress considerations. More specifically, most municipalities have fire codes that specify mandatory egress points for every 4,000 rentable square feet. As a result, the circulation factor must include square footage for an additional exit aisle having a size of 5'×20' for every 4,000 rentable square feet.

The following formula reflects the above logic and considerations and may be used for calculating the circulation factors for user space requirements:

```
DSQUAREFEET = LLENGTH * LWIDTH
IF LLENGTH OR LWIDTH <= 3 THEN
        DRENTABLESQUAREFEET = DSQUAREFEET
ELSEIF DSQUAREFEET < 50 THEN
        DAREA = (LLENGTH + (0.167 * DPW)) *
        (LWIDTH + (0.167 DPW))
        DPANELS = DAREA – DSQUAREFEET
        DSAAREA = SQR(DAREA) * DSA * 0.5
        DPAAREA = SQR (DAREA) * DPA * 0.5 / 3
        DCROSS = (DPA / 2 * DSA) / 6
        DRENTABLESQUAREFEET = DSQUAREFEET +
        DPANELS + DSAAREA + DPAAREA + DCROSS
ELSEIF DSQUAREFEET < 100 THEN
        DAREA = (LLENGTH + (0.167 * DPW)) *
        (LWIDTH + (0.167 DPW))
        DPANELS = DAREA – DSQUAREFEET
        DSAAREA = SQR(DAREA) * DSA* 0.5
        DPAAREA = SQR(DAREA) * DPA * 0.5 / 2
        DCROSS = (DPA / 2 * DSA) / 4
        DRENTABLESQUAREFEET = DSQUAREFEET + DPANELS +
        DSAAREA + DPAAREA + DCROSS
ELSEIF DSQUAREFEET > 100 THEN
        DRENTABLESQUAREFEET = DSQUAREFEET +
        (SQR(DSQUAREFEET) * 0.5 *DPA /12)
END IF
        DRENTABLESQUAREFEET =
        DRENTABLESQUAREFEET * LROOMS
Where:  LWIDTH = WIDTH OF OFFICE OR CUBICLE
        (measured from panel interior surfaces)
        LLENGTH = LENGTH OF OFFICE OR CUBICLE
        (measured from panel interior surfaces)
        DPW = PANEL WIDTH (DEFAULT = 2")
        DPA = PRIMARY AISLE WIDTH (DEFAULT = 5')
        DSA = SECONDARY AISLE WIDTH (DEFAULT = 4')
        LROOMS = NUMBER OF OFFICES OR CUBICLES
```

Phase 2: Determining Building Inefficiency Factors

Figure 3:
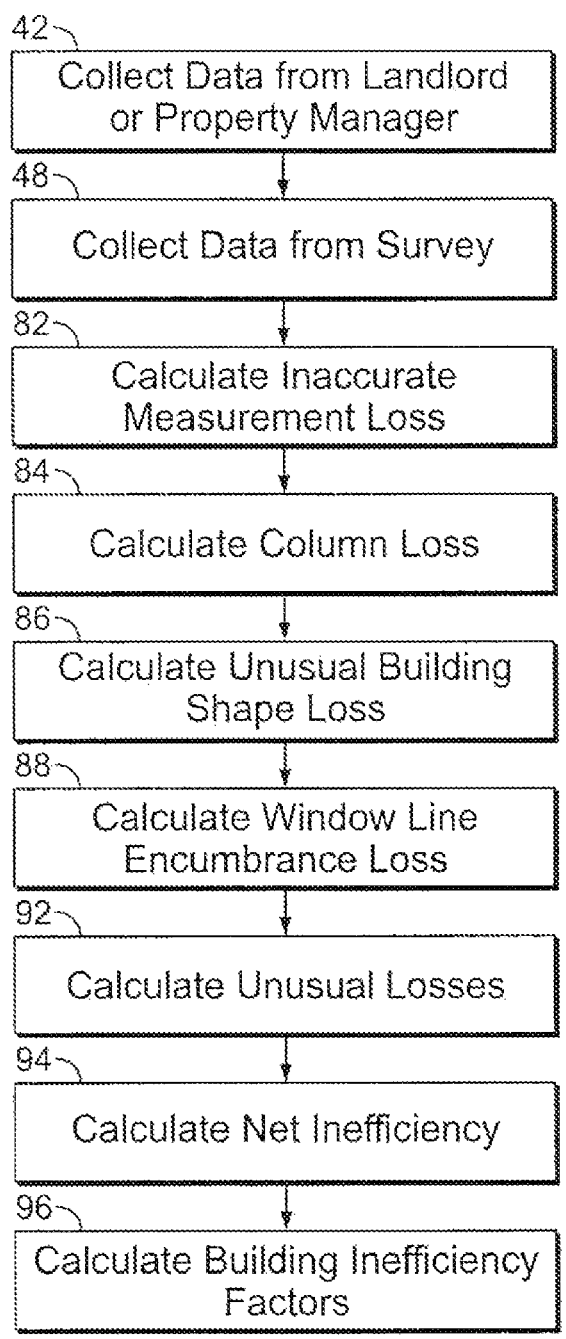
FIG. 3 is a flow chart illustrating the steps for calculating building inefficiency factors in accordance with an embodiment of the system and method present invention.
Figure 4:
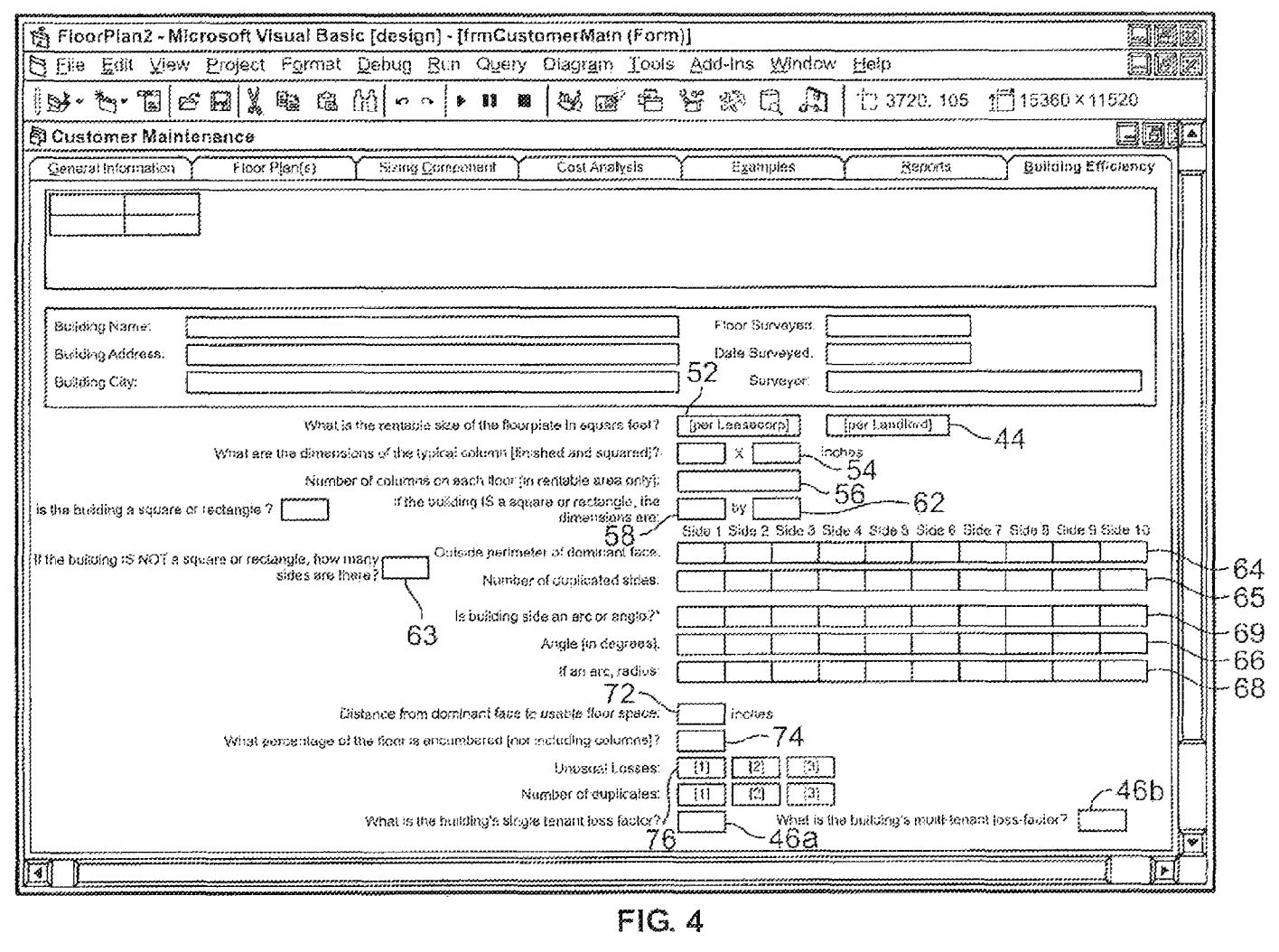

The flowchart of FIG. 3 shows the process for determining the building inefficiency factors in accordance with an embodiment of the present invention. As indicated by block 42 of FIG. 3, the first step in calculating the inefficiency factors for a building is collecting data from the building landlord or property manager. The building efficiency data entry screen of an embodiment of the system of the present invention is presented in FIG. 4. The data collected from the landlord or property manager includes the rentable square footage of the space, which is entered in field 44 of FIG. 4, as well as the single tenant loss factor and the multi-tenant loss factor, which are entered in fields 46*a* and 46*b,* respectively.

Next, as indicated by block 48 of FIG. 3, some additional detailed information for the space is also obtained via an on-site survey or by utilizing building drawings. This information includes the rentable square footage of the space which is determined in accordance with standards issued by Building Owners Management Association International (BOMA). BOMA has created the standard method for measuring floor area in office buildings, which was approved by the American National Standards Institute, Inc. on June 7, 1996. These standards are accepted as the basis for measuring the usable and rentable square feet in office buildings. The rentable square footage thus determined is entered in field 52 of FIG. 4.

In addition, during the survey or drawing review, the dimensions of a typical column for the space are determined as well as the number of columns on each floor. These values are entered into fields 54 and 56 of the screen of FIG. 4, respectively. Even if the columns are round, they are assumed to be squared with the length and width of the columns equal to their diameters.

The "dominant face" of the building is made up of the vertical structures which make up the largest portion of the building side walls. If the building is a square or rectangle, the building depth and width (measured from the exterior surfaces of the dominant faces) are entered in fields 58 and 62. If the building is not square or rectangular, the number of sides is entered in field 63 and the width of each side of the dominant face is entered in fields 64. The number of duplicate sides are entered in fields 65 to limit the number of side widths that must be entered in fields 64. If any of the sides of the dominant face features a curve, the angle and arc radius of the side is indicated in fields 66 and 68, respectively. If any of the sides of the dominant face are joined by angles other than 90°, the angles are entered into fields 66 (the angle between sides 1 and 2 is entered under the column for Side 1, the angle between sides 2 and 3 is entered under the column for Side 2, etc.). Field 69 is used to indicate that the side is curved or is at an angle other than 90° with respect to the neighboring wall in the order entered in fields 64.

If the perimeter of a floor is encumbered, such as by HVAC units of the like, the average distance from the dominant faces to the usable floor space is entered in field 72 and the percentage of the perimeter of the floor that is encumbered is also determined and entered in field 74. Also, the areas of losses due to water columns, private stair wells, angled column supports or other unusual losses are obtained and entered into fields 76.

Once the required data and information is gathered for a building space, five losses are calculated, as indicated by blocks 82, 84, 86,88 and 92 of FIG. 3, and added together to obtain the building's net inefficiency (block 94). The building inefficiency factors are then calculated (block 96).

As illustrated in FIG. 3, block 82, the first loss calculated is the inaccurate measurement loss. The inaccurate measurement loss is simply the difference between the landlord or property management's stated rentable square footage (field 44 in FIG. 4) and the rentable square footage calculated using BOMA standards (field 52 in FIG. 4).

The second loss is the column loss, calculated at block 84 in FIG. 3. The column loss is the loss in space due to the support columns encumbering the space. The column loss thus equals the area of a typical column (obtained by multiplying the dimensions of fields 54 of FIG. 4) multiplied by the number of columns (entered in field 56).

The third loss calculated is the unusual building shape loss, as indicated at block 86 in FIG. 3. If the building floor area is square or rectangular, there is no building shape loss. If the building floor area is not a square or rectangle, there is a building shape loss associated with each building side that is not flat. The equation used to calculate the building loss is selected based on whether the building features angled or curved side walls.

Figure 5:
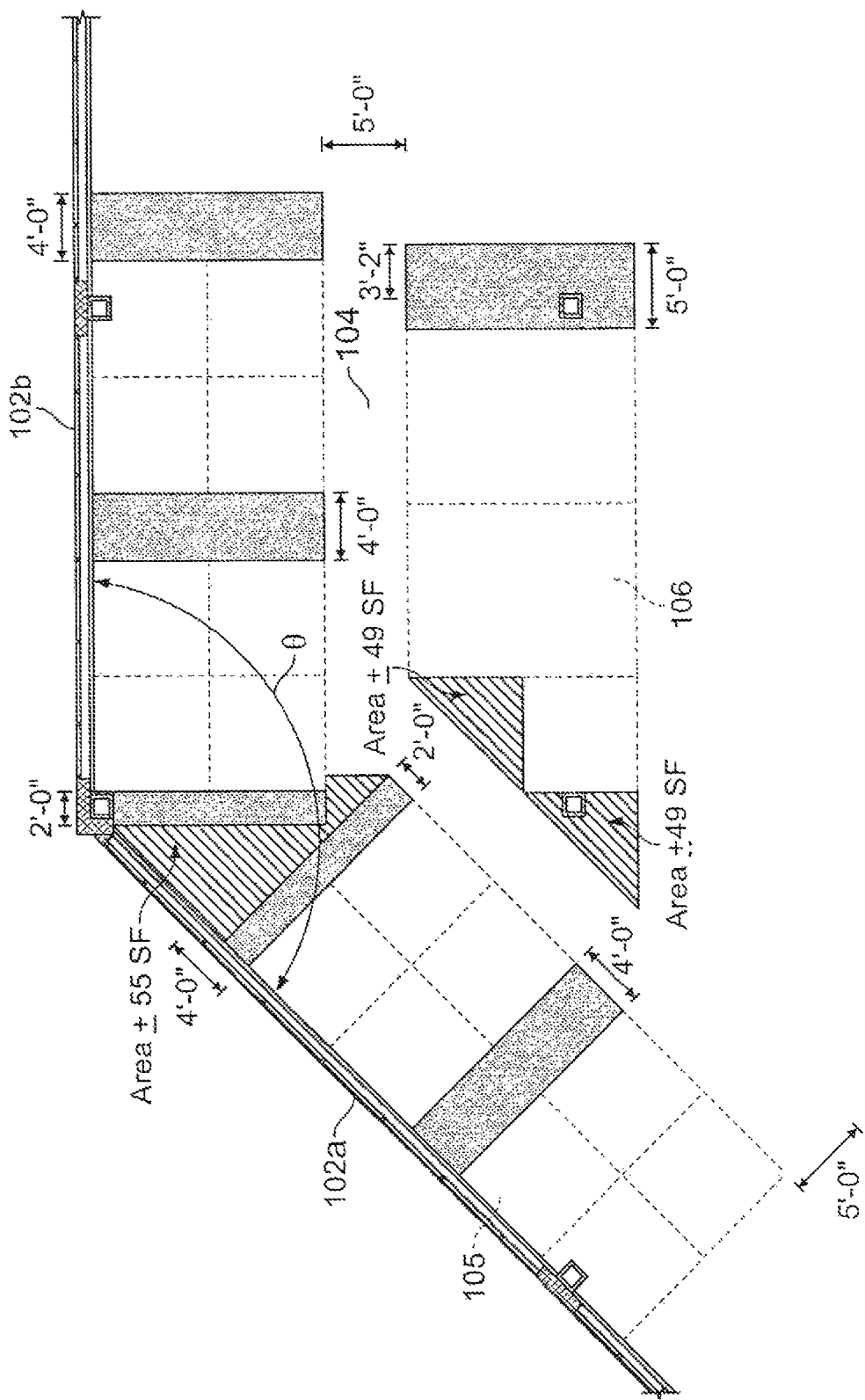
FIG. 5 is a plan view of a portion of a floor space of a building having walls forming an angle other than 90° illustrating why buildings with angles other than 90° create inefficiency losses when trying to lay out workstations.

If the building features angled side walls (walls at angles other than 90°), as illustrated in general at 102*a* and 102*b* in FIG. 5, a 50/50 mix of offices and workstations is taken into account by considering one side of the aisle, 104 in FIG. 5, as being workstations 105 and the other side being offices 106. The standard cubicle width by cubicle depth is assumed to be 7' by 7' while the standard office width by office depth is assumed to be 10' by 15'. The inside angle, θ in FIG. 5, is measured and the following formula is applied for each unique angle θ:

$$BSL = ((OD\verb|^|2) / TAN((\theta * CONPI / 180) / 2) * 2) * D$$
Where: BSL = building shape loss
OD = office depth (Default = 15')
θ = inside angle between angled walls (Field 66 of FIG. 4)
CONPI = 3.14159265359
D = number of cuplicate angles The building shape losses for the sides calculated using the above formula are then added to obtain the total building shape loss due to angled sides. The above formula, however, is only used when the two walls that make up the angle are each at least 25 feet in length, including before a next angle. In the event that either or both of the walls fail to meet this condition, the loss is measured by hand and entered as an "unusual loss" (block 92 in FIG. 3). The hand measurement is performed by measuring the area that would be taken up if the irregular angle were squared (i.e. instead of two walls forming an irregular angle, there were three walls forming two 90 degree angles).

Figure 6:
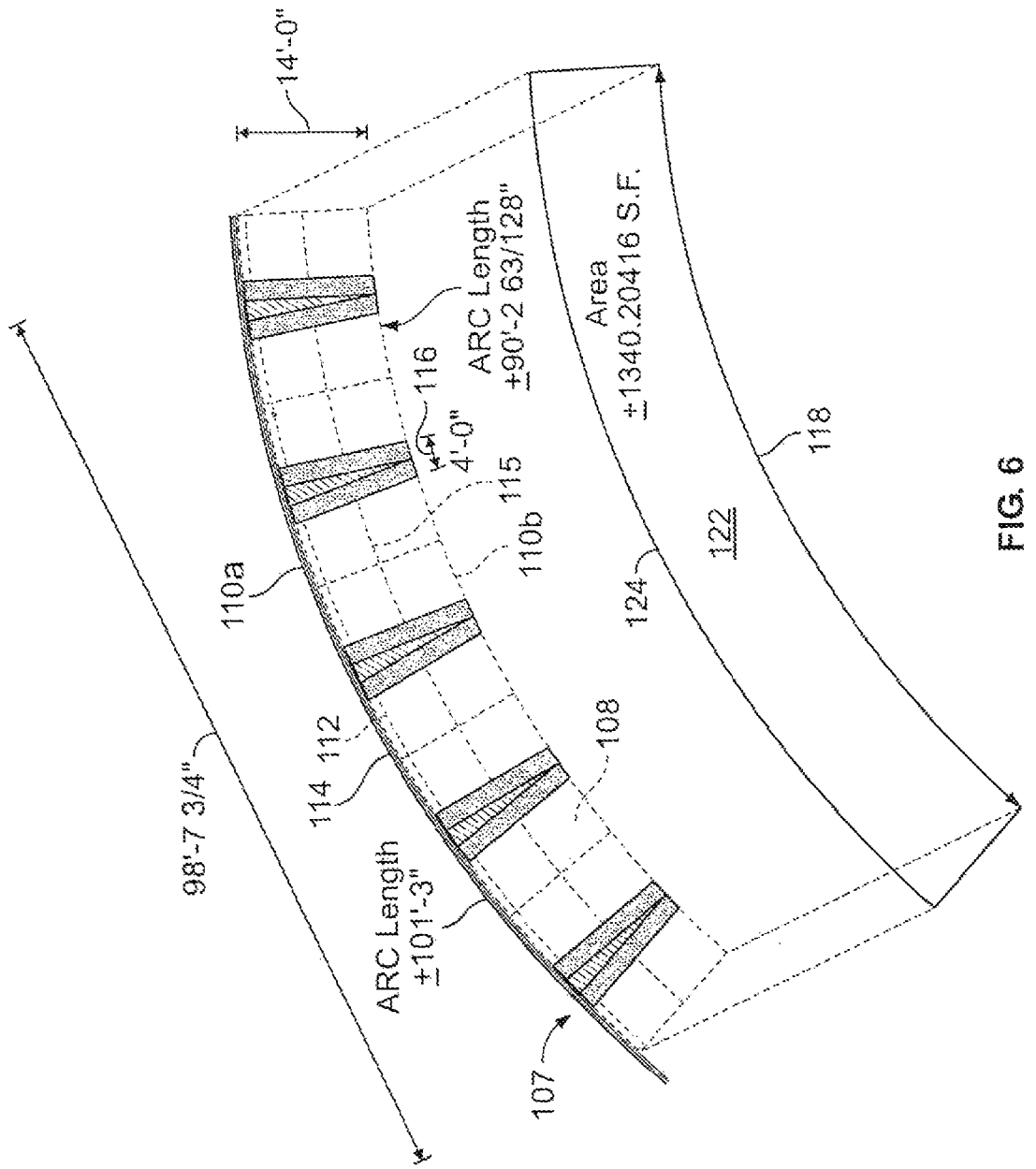
FIG. 6 is a plan view of a portion of a floor space of a building having a curved wall illustrating why buildings that have a curved building side create inefficiency losses when trying to lay out workstations.

If the building possesses curved side walls, as indicated in general at 107 in FIG. 6, a formula is used that calculates the loss based on the number of workstations in 14'×14' groups of four (indicated in phantom at 108 in FIG. 6) and number of 10'×15' offices that would fit between upper and lower arcs, illustrated at 110*a* and 110*b,* respectively, in FIG. 6. In the formula, which is presented below, the segment height, which is the distance between the workstation or office wall indicated at 112 in FIG. 6 and the peak 114 of the section of arc opposing that wall, is calculated and added to the depth of two workstations or one office. In addition, the width of two workstations (115 in FIG. 6) and one aisle (116 in FIG. 6) or one office width (no aisle for accessing the inner workstations required) is divided into the length of the lower arc, indicated at 118 in FIG. 6. Since offices can be adjusted to fit exactly in the area defined between the upper and lower arcs (122 in FIG. 6), no further fit calculations are done for offices.

Since workstations must fit at least one cubicle width and an aisle width within the area 122 of FIG. 6, however, additional fit calculations are done. More specifically, if one more workstation group of four would fit if there were six more inches, another group is added to the result. If not, another calculation is done to see if one workstation width and an aisle would fit. If so, one workstation width and aisle is added to the result. If not, workstations are spread evenly over the length of the arc.

The square footage of the workstation groupings that would fit squarely between the arcs is calculated and subtracted from the total area between the arcs, indicated at 122 in FIG. 6. The square footage of offices that would fit squarely between the arcs is also calculated and subtracted from the total area between the arcs. The remaining square footage for each calculation is added and the total is multiplied by the number of duplicated sides to obtain the total building shape loss due to curved sides.

The following formula reflects the above logic and considerations and may be used for calculating the building shape loss if the building features one or more curved side walls:

```
θ = (2 * CW) / (2 * s)
θo = OW / (2 * s)
Where:  θ = measure in radians of the central angle subtending the arc for workstations
        θo = same as above for offices
        CW = width of cubicle or workstation (default = 7')
        OW = width of office (default = 10')
        s = radius of the arc
'DERIVED ARCSIN FUNCTION FOR WS (WORKSTATION) AND OFFICE
ARCSIN = ATN(θ / SQR(-θ * θ + I))
ARCSINO = ATN(θo / SQR(-θo * θo + I))
Where:  ATN = arctangent
        SQR = square root
'CALCULATE WS AND OFFICE SEGMENT HEIGHT
SH = s - (s * COS (ARCSIN))
SHO = s - (s * COS(ARCSINO))
Where:  SH = segment height for workstations
        SHO = segment height for offices
'RADIUS LESS WS OR OFFICE AND SEGMENT HEIGHT DEPTHS
R2 = s - ((CD * 2) + SH)
R2O = s - (OD + SHO)
Where:  R2 = radius of arc less height for two workstations and segment height
        R2O = radius of arc less office height and segment height
        CD = cubicle or workstation depth (default = 7')
        OD = office depth (default = 15')
'ARC LENGTH AVAILABLE FOR WORKSTATIONS OR OFFICES
SA2 = R2 * A * CONPI / 180
SA2O = R2O * A * CONPI / 180
Where:  SA2 = arc length (arc at bottom of workstations)
        SA2O = arc length (arc at bottom of offices)
        CONPI = 3.14159265359
        A = central angle of the circle whose upper boundary is the arc
'TWO WS WIDTH AND AISLE WIDTH
TWOCWAW = CW * 2 + CONAW
Where:  TWOCWAW = two workstation or cubicle widths and an aisle width
        CONAW = aisle width (default = 4')
'TWO WS DEPTH AND SEGMENT HEIGHT AND OFFICE DEPTH
TWOCDSH = CD * 2 + SH
OFDSH = OD + SHO
Where:  TWOCDSH = two workstation or cubicle depths and segment height
        OFDSH = office depth and segment height
'HOW MANY WSs FIT?
IF INT((SA2 + 0.5) / TWOCWAW) - INT(SA2 / TWOCWAW) <> I THEN
Where:  INT = returns integer portion of a number
'IF ADDITIONAL SIX INCHES WILL NOT FIT ADDITIONAL WS
WSFIT = SA2 / TWOCWAW
Where WSFIT = total square footage of workstations or cubicles that fit
'PERCENT OF WS THAT WILL FIT
REMAINDER = (WSFIT - INT(WSFIT)) * TWOCWAW
'CALCULATE SQ. FOOTAGE WITH ONE WS AND AISLE IF THERE IS ENOUGH ROOM
        IF REMAINDER >= CW + CONAW THEN
            WSFIT = ((INT(WSFIT) * TWOCWAW) + (CW + CONAW)) * TWOCDSH
        ELSE
        'OTHERWISE, CALCULATE SQUARE FOOTAGE
            WSFIT = INT(WSFIT) * TWOCWAW * TWOCDSH
        END IF
ELSE
'NUDGE ADDITIONAL WS GROUP INTO ARC IF ONLY 6" OR LESS NEEDED
        WSFIT = INT((SA2 + 0.5) / TWOCWAW) * TWOCWAW * TWOCDSH
END IF
'SQUARE FOOTAGE OF OFFICEs?
OFFIT = SA2O * (OD + SHO)
Where:  OFFIT = total square footage of offices that fit
'TOTAL WS LOSS
WSTOT = (A / 360 * ((CONPI * (S ^ 2)) - (CONPI * (R2 ^ 2)))) - WSFIT
'TOTAL OFFICE LOSS.
OFTOT = (A / 360 * ((CONPI * (S ^ 2)) - (CONPI * (R2O ^ 2)))) - OFFIT
'CALCULATE TOTAL LOSS TIMES THE NUMBER OF DUPLICATED SIDES
BSL = (WSTOT + OFTOT) * D
Where:  BSL = Building Shape Loss
        D = Number of Duplicate Sides (Fields 65 of FIG. 4)
```

Next, as illustrated by block 88 in FIG. 3, the window line encumbrance loss is calculated. This loss takes into account situations where the perimeter of a floor is encumbered, such as by HVAC units or the like. The window line encumbrance loss is calculated by taking the horizontal distance from the dominant face to the usable space (from field 72 in FIG. 4) and multiplying it by the perimeter of the building (determined using fields 58 and 62 or 64 and 65 of FIG. 4).

Occasionally, there are space area losses on a floor that do not fit into any of the standard formulas above, which are calculated as indicated by block 92 of FIG. 3. In addition to the irregular angle loss described above, such losses may include unusual shaft penetrations, columns that run diagonally through the space (taking up more usable square feet) and leftover stairwells from previous tenants connecting two leased floors. Any irregular angle which fails to meet the conditions specified in the paragraph above regarding angled side walls arid FIG. 5, is hand-measured and also included as an unusual loss. These are not required to be deducted by BOMA standards, and are considered unusual losses by the present invention. These losses are measured, input in fields 76 of FIG. 4 and used as actual square foot losses, as opposed to being calculated by formulas.

Once the five losses of blocks 82-92 of FIG. 3 are calculated or otherwise determined, they are used to calculate the net inefficiency for the space, as indicated by block 94 of FIG. 3. The net inefficiency is calculated by first adding the five losses of blocks 82-92 of FIG. 3 and establishing a ratio between those, losses and the landlord's stated rentable square feet (from field 44 of FIG. 4).

As illustrated in block 96 of FIG. 3, once the net inefficiency is calculated, the single tenant inefficiency factor and the multi-tenant inefficiency factor are calculated using the following formulas and the building single tenant loss factor (from field 46a of FIG. 4) and the building multi-tenant loss factor (from field 46b of FIG. 4):

SINGLE TENANT INEFFICIENCY FACTOR=[(1+
   NET INEFFICIENCY)*(1+BUILDING
   SINGLE TENANT LOSS FACTOR)]−1

MULTI-TENANT INEFFICIENCY FACTOR=[(1+
   NET INEFFICIENCY)*(1+BUILDING MULTI-
   TENANT LOSS FACTOR)]−1

As will be illustrated below, the pure space is multiplied by the appropriate inefficiency factor to provide an inefficiency add-on. The single tenant inefficiency factor is used when the space in question occupies the entire floor of a building so that the tenant is the sole tenant of the floor. The multi-tenant inefficiency factor is used if the space in question is only a portion of the building floor so that the tenant shares the floor with another tenant or tenants.

An example of a report page produced by and in accordance with embodiments of the system and method of the present invention and illustrating a calculation of the single and multi-tenant inefficiency factors performed in accordance with FIG. 3 and the above description is presented in FIG. 7.

An example using circulation factors calculated in accordance with Phase 1 above and inefficiency factors calculated in accordance Phase2 above is presented in Table 2.

TABLE 2

Calculation of Required Space in Accordance with Invention

| | | |
|---|---|---|
| Net usable square footage: | Simply the net square footage when all area requirements are added together (before circulation): | 10,500 |
| Circulation Factor: | The extra space required for aisle ways, ingress and egress calculated in Phase 1: | 1,575 |
| Pure space: | The sum of net usable square feet and circulation factor; also the space required in a perfectly efficient environment: | 12,075 |
| Building Inefficiency Factor: | The add on calculated in Phase 2 for loss attributable to building inefficiencies (assume single tenant for this example), multiply pure space by: | 17.5% |
| Total rentable square footage: | Total space that should be required to lay out the given requirements in this particular building: | 14,188 |

An example of another report page produced by and in accordance with embodiments of the system and method of the present invention is presented in FIG. 8. The circulation factor is presented at 132 while the inefficiency factor is presented in field 134. Prior to production of this report, the user has entered whether the single tenant or multi-tenant situation applies and the specific loss factors of the building in question.

Figure 9:
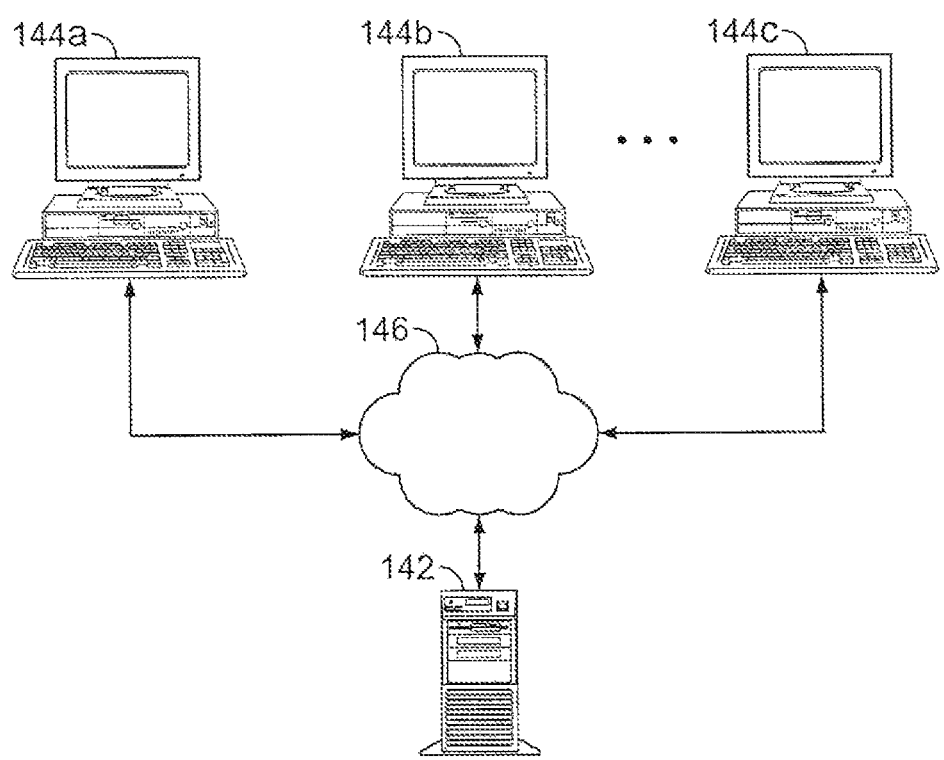
FIG. 9 is a schematic illustrating an embodiment of the system of the present invention.

The hardware of an embodiment of the system of the present invention is illustrated in FIG. 9. The system features a server computer 142 including a processor or microprocessor and memory storage. The application software for performing the calculations described above for Phase 1 and Phase 2 of the invention is loaded onto the server 142 as is the database that stores the data entered into and calculated by the application software. As an example only, the application may be written in Visual Basic 6.0 or Visual Basic .Net with MICROSOFT ACCESS 3.0 or SQL Server as a data container. The formulas and code for calculating circulation factors and inefficiency factors may also be programmed in Visual Basic for Applications (MICROSOFT WORD), standard spreadsheet applications (MICROSOFT EXCEL) and standard programming languages such as SEQUEL. The data can be migrated into any compatible database.

User workstations 144a-144c featuring displays, such as personal computers, communicate with the server 142 through a network 146 such as a local area network or the Internet (using, for example, Microsoft's .NET framework and a web server). User's workstations 144a-144c may connect to the application and database on server 142, for example, through ODBC (Open Database Connectivity). As an alternative to a network system, the application software and database may reside on a standalone personal computer. The server or personal computer may include a compact disk (CD) drive so that the application software may be downloaded or run off of a CD itself. The application software may alternatively be stored on other types of machine-readable mediums.

The circulation factors, inefficiency factors and related calculations provided by the system and method of the present invention may be used by real estate firms to assist clients in determining appropriate rentable areas required or to identify inefficiencies in space plans prepared by outside architects and planners. In addition, the system and method of the present invention may be used by purchasers of office buildings for analyzing the relative efficiency and potential marketability of an office building. The system and method of the present invention may also be used by the architectural/design industry to project the appropriate amounts of space for their clients.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for calculating a usable space required for a tenant in a building comprising:
   a. memory storage having software which permits a user to input areas of rooms required by the tenant;
   b. a processor in communication with the memory storage and using the software to:
      i) calculate a circulation loss for each of the rooms by;
         A. for a room having an area greater than or equal to a predefined area size, calculating a corresponding circulation loss using a user specified aisle width and the area of the room;
         B. for a room having an area less than the predefined area size, calculating a corresponding circulation loss using a user specified number of individual workstations for a workstation cluster, the user specified aisle width and the area of the room;
      ii) add a total of the room areas and the circulation losses to determine a usable space required by the tenant;
   c. a display in communication with the memory and the processor, said display presenting to a user the usable space required for the tenant in the building.

2. The system of claim 1 wherein the processor and memory storage are included in a server and the display is included in a user workstation that communicates with the server through a network.

3. The system of claim 1 wherein the processor, memory storage and display are included in a standalone computer.

4. The system of claim 1 wherein the calculation of the circulation loss in b.i) B. also uses a user specified secondary aisle width for aisles needed to access interior workstations.

5. The system of claim 1 wherein b.i)B. includes dividing the user specified aisle width by two if the user specified number of individual workstations is four and dividing the user specified aisle width by three if the user specified number of individual workstations is six.

6. The system of claim 1 wherein the user specified aisle width is five feet.

7. The system of claim 1 wherein step b.i) includes the step of assuming that a room is a closet requiring no circulation loss if at least one dimension of the room area is less than or equal to approximately three feet and assuming that the room is not a closet if at least one dimension of the room area is not less than or equal to approximately three feet.

8. The system of claim 1 wherein step b.i) includes the step of assuming that a room is a filing cabinet requiring no circulation loss if at least one dimension of the room area is less than or equal to approximately three feet and assuming that the room is not a filing cabinet if at least one dimension of the room area is not less than or equal to approximately three feet.

9. The system of claim 1 wherein the calculation of b.i) includes area for an additional exit aisle in accordance with fire codes.

10. A system for calculating a rentable space required for a tenant in a building comprising:
   a. memory storage having software which permits a user to input areas of rooms required by the tenant, a building single tenant loss factor, a building multi-tenant loss factor, a landlord's stated rentable square feet for a space in the building and data relating to losses in actual usable space in the building;
   b. a processor in communication with the memory storage and using the software to:
      i) determine areas of rooms required by the tenant;
      ii) add a total of the room areas to determine a usable space required by the tenant;
      iii) calculate an inefficiency factor for the building based on the data relating to losses in actual usable space in the building by;
         A. calculating an inaccurate measurement loss using a difference between the landlord's stated rentable square feet for a space in the building and a rentable square feet for the space in the building calculated using standards;
         B. calculating a column loss using areas of columns encumbering the space in the building if a column is present in the space of the building;
         C. calculating an unusual building shape loss if a side of the building is not flat or is at an angle other than approximately 90° with respect to an adjacent wall;
         D. calculating a window line encumbrance loss using a perimeter of the building if an encumbrance is positioned at the perimeter in the space of the building;
         E. calculating an unusual loss that does not fit into steps A. through D. if such an unusual loss is present in the space of the building;
         F. adding the losses of steps A. through E.;
         G. dividing, the added losses of step F. by the landlord's stated rentable square footage for a space in the building to calculate a net inefficiency;
         H. calculating the inefficiency factor based on the net inefficiency and the building single tenant loss factor or the building multi-tenant loss factor;
      iv) multiply the usable space by the inefficiency factor to obtain a building efficiency loss;
      v) add the building efficiency loss to the usable space to obtain the rentable space required for the tenant in the building;
   c. a display in communication with the memory and the processor, said display presenting to a user the rentable space required for the tenant in the building.

11. The system of claim 10 wherein the processor and memory storage are included in a server and the display is included in a user workstation that communicates with the server through a network.

12. The system of claim 10 wherein the processor, memory storage and display are included in a standalone computer.

13. The system of claim 10 wherein the building side of b.iii)C. that is not flat is angled.

14. The system of claim 10 wherein the building side of b.iii)C. that is not flat is curved.

15. The system of claim 10 wherein b.iii)C. includes taking into account a 50/50 mix of offices and workstations if the building side that is not flat is angled.

16. The system of claim 10 wherein b.iii)C. includes taking into account a number of offices and workstations that would fit between upper and lower arcs if the building side that is not flat is curved.

17. A non-transitory machine-readable medium on which has been prerecorded a computer program which, when executed by a processor, performs the following steps:
   a. receives areas of rooms required by a tenant;
   b. calculates a circulation loss for each of the rooms by;
      i) for a room having an area greater than or equal to a predefined area size, calculating a corresponding circulation loss using a user specified aisle width and the area of the room;
      ii) for a room having an area less than the predefined area size, calculating a corresponding circulation loss using a user specified number of individual workstations for a workstation cluster, the user specified aisle width and the area of the room;

c. adds a total of the room areas and the circulation losses to determine a usable space required by the tenant.

18. The machine-readable medium of claim 17 wherein the calculation of the circulation loss in b.ii) also uses a user specified secondary aisle width for aisles needed to access interior workstations.

19. A non-transitory machine-readable medium on which has been prerecorded a computer program which, when executed by a processor, performs the following steps:
   a. receives areas of rooms required by a tenant, a building single tenant loss factor, a building multi-tenant loss factor, a landlord's stated rentable square feet for a space in the building and data relating to losses in actual usable space in a building;
   b. adds a total of the room areas to determine a usable space required by the tenant;
   c. calculates an inefficiency factor for the building based on the data relating to losses in actual usable space in the building by;
      i) calculating an inaccurate measurement loss using a difference between the landlord's stated rentable square feet for a space in the building and a rentable square feet for the space in the building calculated using standards;
      ii) calculating a column loss using areas of columns encumbering the space in the building if a column is present in the space of the building;
      iii) calculating an unusual building shape loss if a side of the building is not flat or is at an angle other than approximately 90° with respect to an adjacent wall;
      iv) calculating a window line encumbrance loss using a perimeter of the building if an encumbrance is positioned at the perimeter in the space of the building;
      v) calculating an unusual loss that does not fit into steps i) through iv) if such an unusual loss is present in the space of the building;
      vi) adding the losses of steps i) through v);
      vii) dividing the added losses of step vi) by the landlord's stated rentable square footage for a space in the building to calculate a net inefficiency;
      viii) calculating the inefficiency factor based on the net inefficiency and the building single tenant loss factor or the building multi-tenant loss factor;
   d. multiplies the usable space by the inefficiency factor to obtain a building efficiency loss; and
   e. adds the building efficiency loss to the usable space to obtain the rentable space required for the tenant in the building.

20. The machine-readable medium of claim 19 wherein c.iii) includes taking into account a number of offices and workstations that would fit between upper and lower arcs if the building side that is not flat is curved.

* * * * *